(12) United States Patent
Laier

(10) Patent No.: US 10,140,190 B1
(45) Date of Patent: Nov. 27, 2018

(54) EFFICIENT TRANSACTION LOG FLUSHING

(71) Applicant: EMC Corporation, Hopkinton, MA (US)

(72) Inventor: Max Laier, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 318 days.

(21) Appl. No.: 15/084,234

(22) Filed: Mar. 29, 2016

(51) Int. Cl.
*G06F 17/30* (2006.01)
*G06F 11/14* (2006.01)
*H04L 29/08* (2006.01)

(52) U.S. Cl.
CPC .... *G06F 11/1474* (2013.01); *G06F 17/30227* (2013.01); *H04L 67/1097* (2013.01); *G06F 2201/87* (2013.01)

(58) Field of Classification Search
CPC ......... G06F 17/30079; G06F 17/30345; G06F 17/30339; G06F 17/30377
USPC .......................................................... 707/648
See application file for complete search history.

(56) References Cited

U.S. PATENT DOCUMENTS

| | | | | |
|---|---|---|---|---|
| 6,990,547 B2* | 1/2006 | Ulrich | | G06F 17/30067 707/E17.01 |
| 7,752,402 B2* | 7/2010 | Fachan | | G06F 3/0619 711/161 |
| 7,774,565 B2* | 8/2010 | Lewin | | G06F 17/30368 707/648 |
| 8,214,612 B1* | 7/2012 | Natanzon | | G06F 11/1612 707/622 |
| 8,356,150 B2* | 1/2013 | Fachan | | G06F 17/30194 711/162 |
| 9,069,790 B2* | 6/2015 | Lord | | G06F 17/30218 |
| 2005/0273527 A1* | 12/2005 | Olstad | | G06F 17/30368 710/56 |
| 2008/0046444 A1* | 2/2008 | Fachan | | G06F 17/30194 |
| 2008/0046667 A1* | 2/2008 | Fachan | | G06F 3/0619 711/154 |
| 2011/0022790 A1* | 1/2011 | Fachan | | G06F 17/30194 711/104 |
| 2011/0153569 A1* | 6/2011 | Fachan | | G06F 12/0804 707/648 |
| 2014/0280394 A1* | 9/2014 | Lord | | G06F 17/30218 707/823 |
| 2015/0088822 A1* | 3/2015 | Raja | | G06F 17/30324 707/625 |
| 2015/0339343 A1* | 11/2015 | Raja | | G06F 17/30324 707/625 |

(Continued)

*Primary Examiner* — Jean M Corrielus
(74) *Attorney, Agent, or Firm* — Krishnendu Gupta

(57) ABSTRACT

Implementations are provided for efficient flushing of a transaction journal. A transaction journal can be maintained in memory of a node that stores writes to the targeted to the drives housed within the node. Drives within the node can be score for busyness when determining which transactions to flush from memory to disk. Journal entries relating to writes that have a high locality can be selected for flushing. Additionally, each block on each disk in a node can be tracked for past writes which can be used as active intelligence to predict when a journal entry may be rewritten in the future. Journal entries relating to blocks with a high probability to be overwritten can avoid being flushed. By increasing the efficiency of transaction journal flushing, a node can increase the throughput of data, have less busy disks, incur less write amplification, and support more coalescing.

20 Claims, 7 Drawing Sheets

(56) References Cited

U.S. PATENT DOCUMENTS

| | | | |
|---|---|---|---|
| 2016/0034214 A1* | 2/2016 | Kamp | G06F 17/30377 |
| | | | 711/114 |
| 2016/0041906 A1* | 2/2016 | Mukherjee | G06F 17/30315 |
| | | | 711/119 |
| 2016/0085834 A1* | 3/2016 | Gleeson | G06F 17/30339 |
| | | | 707/693 |
| 2016/0140206 A1* | 5/2016 | Hase | G06F 17/30345 |
| | | | 707/607 |
| 2017/0277713 A1* | 9/2017 | Strauss | G06F 17/30079 |

* cited by examiner

| BLOCK ADDRESS | TIME OF FIRST WRITE | WRITE COUNTER |
|---|---|---|
| 0001 | 1/1/2016 – 7:00:41 AM | 11 |
| 0002 | | 0 |
| 0003 | 1/1/2016 – 6:12:10 AM | 32 |
| 0004 | 1/3/2016 – 8:37:31 PM | 2 |
| 0005 | 1/2/2016 – 12:07:24 AM | 4 |

FIG. 3

EFFICIENT TRANSACTION LOG FLUSHING

FIELD OF THE INVENTION

This invention relates generally to distributed file systems, and more particularly to implementations for a scalable cloud backup capability for a cluster of nodes operating as a distributed file system.

BACKGROUND OF THE INVENTION

Distributed file systems offer many compelling advantages in establishing high performance computing environments. One example is the ability to easily expand, even at large scale. In one example, a distributed file system can operate under a cluster of nodes topology, whereby clients can connect to any node among the cluster of nodes to perform file system activity. Individual nodes among the cluster of nodes each can contain their own processor(s), storage drives, memory and the like. Operating together in a cluster, the nodes can respond to client requests, store data, mirror data, and accomplish all the tasks of a modern file system. A cluster of nodes, in some cases, can provide easy scalability by providing for new nodes to be added to the cluster of nodes to increase the amount of storage space within the distributed file system and/or to meet other needs of the users of the distributed file system.

As a distributed file system receives write requests from clients and/or internal processes, those write requests can be logged and stored within an in-memory journal before committing the write data onto disk storage. For a distributed file systems with consistent workflows, write patterns may be easy to classify and efficient method for flushing writes from the in-memory journal to disk may be trivial. However, in distributed file systems that don't follow traditional classifications of write data, deciding when to flush the journal and commit at least some of the changes stored within the journal to disk can vary in efficiency. For example, disk drives can be overloaded, disk seek times can delay follow up writes, and frequently overwritten blocks can be needlessly flushed just prior to being overwritten again. Therefore, there exists a need to efficiently flush journal entries from an in-memory journal to disk such that individual disk drives are not overloaded, such that writes to a particular drive are written efficiently, and such that frequently overwritten blocks are not written prematurely.

SUMMARY

The following presents a simplified summary of the specification in order to provide a basic understanding of some aspects of the specification. This summary is not an extensive overview of the specification. It is intended to neither identify key or critical elements of the specification nor delineate the scope of any particular embodiments of the specification, or any scope of the claims. Its sole purpose is to present some concepts of the specification in a simplified form as a prelude to the more detailed description that is presented in this disclosure.

In accordance with an aspect, a write transaction journal can be maintained for a node among a cluster of nodes, wherein write transaction journal entries are associated with a drive among a plurality of drives of the node and a data block address associated with the drive. An oldest write time and a total number of writes can be dynamically stored for each data block among the plurality of data blocks in a kernel memory space of the node based on dynamic monitoring the write transaction journal. Each data block among the plurality of data blocks can be dynamically scored for a frequency of writes based on the oldest write time and the total number of writes associated with each data block. Drives among the plurality of drives can be dynamically scored for a busyness score. Each drive among the plurality of drives can be divided into drive segments. Each write transaction journal entry can be associated with a drive segment among the set of drive segments for the drive associated with each write transaction journal entry. Each drive segment among the set of drive segments for each drive among the plurality of drives can be dynamically scored for a locality score. A flushing event can be determined based on maintaining the write transaction journal. In response to determining a flushing event, a set of write transaction journal entries can be flushed, wherein the set of write transaction journal entries are determined based on the busyness score of the drive associated with the write transaction journal entry, the segment score associated with the drive segment associated with the write transaction journal entry, and the frequency of writes score associated with the data block address associated with the write transaction journal entry.

The following description and the drawings set forth certain illustrative aspects of the specification. These aspects are indicative, however, of but a few of the various ways in which the principles of the specification may be employed. Other advantages and novel features of the specification will become apparent from the detailed description of the specification when considered in conjunction with the drawings.

BRIEF DESCRIPTION OF THE DRAWINGS

FIG. 3 illustrates example data block write data scoring table in accordance with implementations of this disclosure;

DETAILED DESCRIPTION

Figure 1:
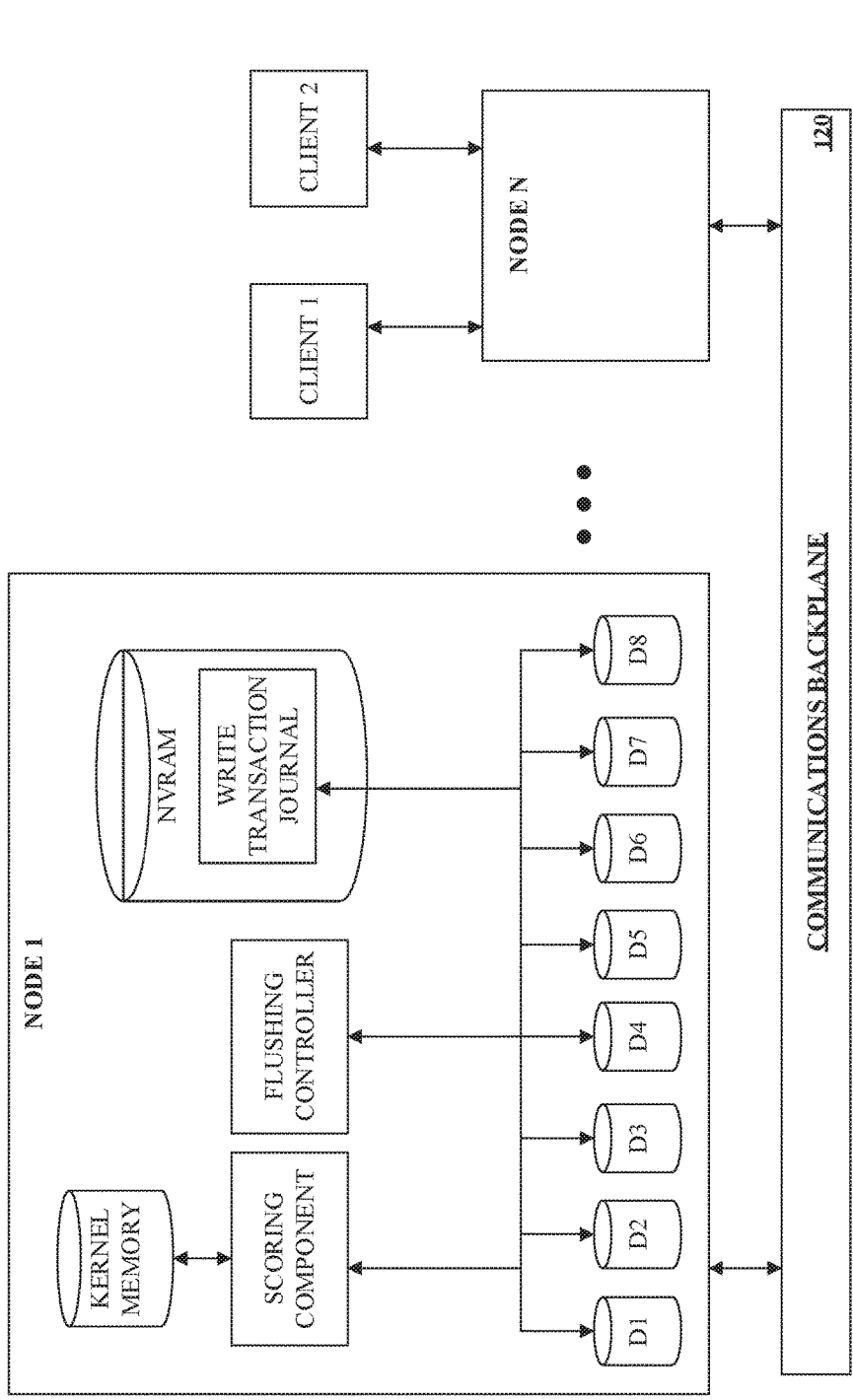
FIG. 1 illustrates an example cluster of nodes including a scoring component, a flushing controller, and an in memory transaction journal in accordance with implementations of this disclosure.

The innovation is now described with reference to the drawings, wherein like reference numerals are used to refer to like elements throughout. In the following description, for purposes of explanation, numerous specific details are set forth in order to provide a thorough understanding of this innovation. It may be evident, however, that the innovation can be practiced without these specific details. In other instances, well-known structures and devices are shown in block diagram form in order to facilitate describing the innovation.

The term "inode" or "logical inode" or "LIN" as used herein refers to data structures that may store information, or meta-data, about files and folders, such as size, file ownership, access mode (read, write, execute permissions), time and date of creation and modification, file type, or the like. In at least one of the various embodiments, inode data structures may contain one or more references or pointer to the actual data blocks of the contents stored in the file. In at least one of the various embodiments, inodes may be in a known location in a file system. From an inode, a reader or writer may access the contents of the inode and the contents of the file. Some file systems implement inodes using a data structure called an inode. In at least one of the various embodiments, a data structure explicitly named "inode" may be absent, but file systems may have data structures that store data similar to inodes and may provide capabilities similar to inodes as described herein.

As used herein, the term "node" refers to a physical computing device, including, but not limited to, network devices, servers, processors, cloud architectures, or the like. A node may also include virtual machines, or the like. In at least one of the various embodiments, nodes may be arranged in a cluster interconnected by a high-bandwidth, low latency network backplane. In at least one of the various embodiments, non-resident clients may communicate to the nodes in a cluster through high-latency, relatively low-bandwidth front side network connections, such as Ethernet, or the like.

The term "cluster of nodes" refers to one or more nodes that operate together to form a distributed file system. In one example, a cluster of nodes forms a unified namespace for a distributed file system. Nodes within a cluster may communicate information about nodes within the cluster to other nodes in the cluster. Nodes among the cluster of nodes function using the same logical inode "LIN" mappings that describe the physical location of the data stored within the file system. Clients can connect to any one node among the cluster of nodes and access data stored within the cluster. For example, if a client is connected to a node, and that client requests data that is not stored locally within the node, the node can then load the requested data from other nodes of the cluster in order to fulfill the request of the client. Data protection plans can exist that stores copies or instances of file system data striped across multiple drives in a single node and/or multiple nodes among the cluster of nodes, thereby preventing failures of a node or a storage drive from disrupting access to data by the clients. Metadata, such as inodes, for an entire distributed file system can be mirrored and/or synched across all nodes of the cluster of nodes.

The terms "disk" or "drive" or "disk drive" used throughout this specification in general refer to a piece of physical hardware, installed within the node chassis, that is used for stable data storage by the distributed file system. The drives can be capable of removal; however, they generally aren't removed from the node except for cases of failure or upgrade. In one implementation, drives can be hard disk drives ("HDDs"), solid state drives ("SSDs"), magnetic tape drives, etc.

Implementations are provided herein for efficient flushing of a transaction journal. A transaction journal can be maintained in memory that stores changes to the file system that have not yet been committed to disk. The journal logs pending transactions and as it fills up, the journal can be flushed such that transactions in the journal are committed to disk. By flushing journal entries, committed journal entries can be removed from the journal freeing space for new journal entries to be stored within the journal. Methods to select which journal entries to flush can be instrumental in increasing write throughput. For example, one goal in choosing which journal entries to flush would be to avoid overloading any individual drive and attempt to keep all drives within the node as close to equally busy as possible. Another goal would be to send a stream of writes to a particular drive in a way that maximizes disk locality and minimizes disk seek delays. Another goal is to avoid frequently flushing disk journal entries targeted to the same data block addresses.

Implementations are provided herein for considering the busyness of drives within a node when determining which transactions to flush from memory to disk. In addition, journal entries' relating to writes that have a high locality can be selected to minimize disk seeks when flushing transactions to disk. Each block on each disk in a node can be tracked for past writes which can be used as active intelligence to predict when a journal entry may be rewritten in the future. Journal entries relating to blocks with a high probability to be overwritten can avoid being flushed. It can be appreciated that by increasing the efficiency of transaction journal flushing, a node can increase the throughput of data, have less busy disks, incur less write amplification, and support more coalescing.

Referring now to FIG. 1, there is illustrated an example cluster of nodes including a scoring component, a flushing controller, and an in memory transaction journal in accordance with implementations of this disclosure. The contents of the node have been abstracted to include a subset of the overall set of components of the node for explanation of the implementations of this disclosure. Additional contents of nodes are explained in greater detail in relation to FIGS. 6 and 7.

Node 1 is one node among a cluster of nodes that contain "N" (where N is an integer greater than 1) nodes. Client 1 and client 2 are connected to Node N as an example that clients can connect to any node among the cluster of nodes to access data of the distributed file system. In one example, Client 1 can initiate a file system transaction that requires data to be written to an existing file/metadata structure. The file is associated with a LIN that Node N can use to determine the block address and the disk where the write data needs to be written. For example, the write data initiated by Client 1 can be targeted to a block address location on Disk 2 ("D2") on Node 1. The write data and any metadata necessary to make the write can be sent from Node N to Node 1 for storage in the write transaction journal of Node 1.

It can be appreciated that some data storage systems can choose the location for new writes such that the location choice can be used to efficiently flush writes to disk. For example, the locations of writes for a set of journal transactions can be targeted to block address ranges on a single disk to increase efficiency. However, in some implementations of this disclosure, the disk and block address space within the disk for writes are allocated statically as data for existing files is overwritten in place.

It can be appreciated that updating a file system to reflect changes to files and directories can require many separate independent write operations, even for operations that are not direct writes. For example, a delete operation can include several independent writes to a directory structure, an inode pool, a free disk block pool, etc. In another example, a write operation can involve writes to blocks on disparate disks on disparate nodes.

In one implementation, each node in the cluster of nodes can contain a Non-Volatile Random Access Memory ("NVRAM") space for storing all or a portion of the nodes write transaction journal. It can be appreciated that in other implementations different types of memory can be used to store the write transaction journal. The write transaction journal stores write transactions made by Clients and/or internal processes initiated by the node or other nodes of the cluster of nodes.

Node 1, as depicted, contains 8 drives, D1-D8, to store file system data. It can be appreciated that the drives can contain a mix of live data, metadata, mirrored data, backup data, snapshot data, etc. It can be appreciated that nodes can contain substantially more drives than the 8 depicted in FIG. 1.

A flushing controller can manage which transactions from the write transaction journal to flush and the timing for when the flushing should occur. It can communicate with the scoring component to use/assess/interpret any scoring data related to write transaction journal entries.

A scoring component can score various aspects of the flushing process. For example, in one implementation, each disk drive on the node can be scored for a busyness score. The drive may have active clients reading data from the drive that take precedence over any pending writes. The drive may already be flushing writes from the transaction journal. The drive may be offline or undergoing maintenance activity that is consuming the bandwidth of the drive and limiting its availability to support reads and/or writes. By determining a busyness score associated with the drive, a least busy drive can be prioritized as a flushing target versus busier drives.

In one implementation, the scoring component can assess entries in the write transaction journal for a locality score. For example, spinning drive technology, in general, works more efficiently when writing to areas of the drive that are near each other. It can be appreciated that by writing to areas with high locality, disk seek time can be minimized and the set of writes to flush with high locality can processed more efficiently than a set of writes with lower locality. Locality scoring is described in further detail in relation to FIG. 2.

In one implementation, the scoring component can establish space in kernel memory to store aggregate write tallies for individual data blocks of the drives within the node. For example, a first write time and a counter for total number of writes can be stored in kernel memory for each block of each drive of the node. In one implementation, if kernel memory space reaches allocated to this function reaches capacity, the oldest write data can discarded to make room for the most recent write data. Frequency of writes scoring is described in further detail in relation to FIG. 3.

Figure 2:
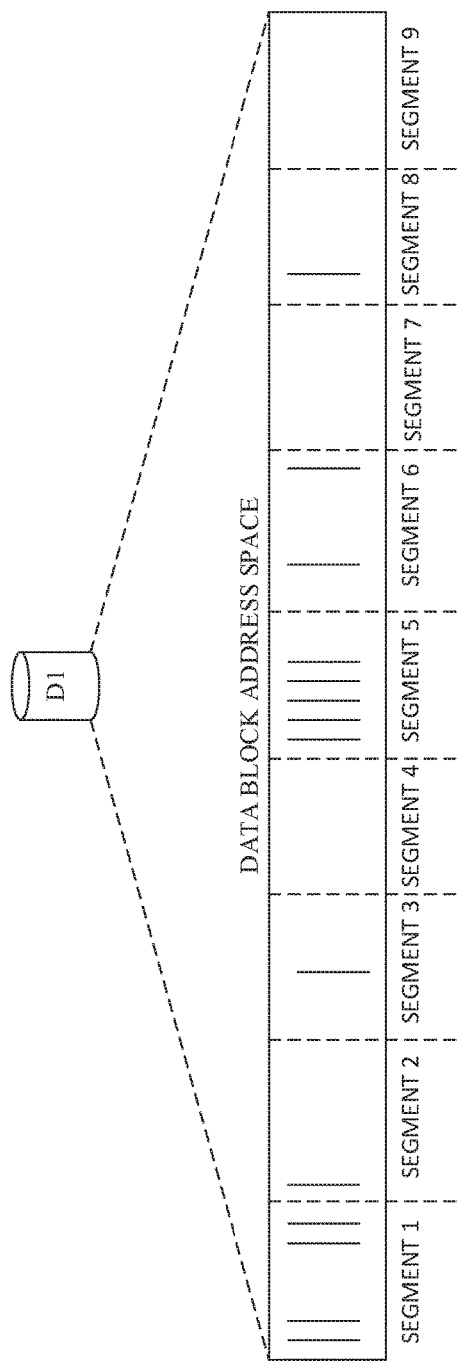
FIG. 2 illustrates an example data block address space for a single disk drive divided into segments in accordance with implementations of this disclosure.

Referring now to FIG. 2, there is illustrated an example data block address space for a single disk drive divided into segments in accordance with implementations of this disclosure. Entries from the write transaction journal can be assessed to determine their location within the physical address space of the drive it is targeted to be written to. Those journal entries that are grouped together near other entries can have a higher locality score than those entries that are not near other entries.

In one implementation, the data block address space of a disk (e.g., D1 from FIG. 2) can be divided into segments. In one implementation, the segments of the disk are all approximately the same size (e.g., number of individual data blocks). Segments 1-9 are depicted on FIG. 2 for D1. Each segment is the same size. The segment boundaries are delineated by dashed lines. Journal entries that are associated with block address locations on D1 have been assessed and their location has been marked on FIG. 2 by solid vertical lines within the segment. For example, Segment 1 contains four pending write transaction entries, Segment 2 contains one pending write transaction entry, Segment 5 contains five pending write transaction entries, etc.

In one implementation, the locality score associated with a transaction journal entry can be the total amount of pending journal entries targeted to the segment of the disk. Therefore, the greater the amount of pending journal entries targeted to the segment the individual journal entry is targeted to, the greater the locality score for the journal entry.

It can be appreciated that by using equally sized segments, write entries clustered near a segment border may have an objectively high locality, but due to an accounting based on their segment location, have a lower locality score than a lesser number of entries within a differing segment that are clustered entirely within the differing segment. In one implementation, a method can be used that determines clusters of pending writes perfectly; however, the compute resources to generate a more perfect solution may provide less gains than a less perfect solution. In one implementation, compute resources can be assessed and dynamically monitored to dynamically determine the fidelity of locality scoring used that maximizes locality with available compute resources.

It can be appreciated that if a drive specification states that it takes 10 milliseconds to perform a disk seek from the beginning of the disk to the end, then the time to disk seek from the beginning of a segment to the end of the segment is equal to 10 milliseconds divided by the number of approximately equally sized segments.

Referring now to FIG. 3, there is illustrated example data block write data scoring table in accordance with implementations of this disclosure. As stated above with respect to FIG. 1, an accounting can be kept in kernel memory space for a time of first write and a total number of writes for each block address of each disk drive within a node.

A dynamic accounting can occur based on dynamically monitoring the transaction journal. In one implementation, if a new journal entry is targeted to the same block address as an existing journal entry, the existing journal entry is overwritten by the new journal entry as the existing journal entry does not need to be written to disk only to be overwritten by new journal entry at a future point in time. Therefore the overwritten journal entry is never flushed to disk. In one implementation, by dynamically monitoring the transaction journal instead of monitoring the writes actually flushed to disk, a more accurate accounting can be kept for the amount of writes targeted to a specific data block over time.

FIG. 3 shows an example of five block address locations from a single disk drive. Each block address is associated with a time of first write and a total number of writes. In one implementation, a frequency of writes score can be generated for each block address by using the current time and the time of the first write to determine a time period, and then using the total number of writes and the time period to determine the average length of time between writes.

In one implementation, determining when to flush the write transaction journal entries can be based on the capacity of the write transaction journal, the dynamic fill rate of the transaction journal, a combination of both the write transaction journal capacity and the dynamic fill rate, or other methods during off-peak (e.g., less busy) times. In one implementation, a "projected capacity time" can be dynamically generated based on the capacity of the write transaction journal, the current amount of entries within the transaction journal, the dynamic fill rate of the transactional journal, and scheduled transaction journal flushing. For example, the projected capacity time can indicate a best projection of when the transaction journal will reach capacity in the future such that flushing or additional flushing is required to create room for new journal entries.

In one implementation, when the portion of NVRAM allotted for the write journal reaches capacity, a flushing event can be triggered.

In one implementation, when the node lacks activity and there are spare disk resources available to process write transactions, any backlog in the write transaction journal can be cleared to better accommodate any unknown future activity. For example, if a fill rate of the transaction journal is constant, we can have constant flushing based on the fill rate. When the fill rate slows, idle disk drives can be determined based on a busyness score associated with the drive and the write transaction journal entries targeted to the idle drives can be flushed in turn until the write transaction journal eventually is fully flushed.

In one implementation, a flushing controller can look at the fill rate over time of the write transaction journal and use the fill rate to dynamically flush the write transaction journal to accommodate the fill rate. In one implementation, the flushing controller can leave some headroom to accommodate a spike in writes that the fill rate may not accurately be able to predict. In one implementation, the flushing controller is tuned to flush as little data from the write transaction journal as possible based on the fill rate. It can be appreciated that by minimizing flushing of the write transaction journal, coalescing and locality can be increased.

In one implementation, when a flushing event is triggered, a disk drive is first selected as a write target based on the busyness scores of the entire set of disk drives housed within the node. The drive with lowest busyness score can be selected. Next, a segment of the disk drive can be selected based on the segment having the highest locality score. Using the fill rate, the write transaction journal capacity, and the frequency of writes score for each journal entry targeted to the selected segment, it can be determined whether each write transaction entry in the targeted segment is likely to be overwritten before the next flushing event. For example, a buffer time can be calculated based on the size of the NVRAM journal space and the fill rate and be used in comparison to the frequency of writes score to determine the likelihood the journal entry will be overwritten. Finally, the set of writes that are unlikely to be overwritten before the next flushing event, targeted to the segment with the greatest locality score within the least busy drive can be flushed.

Figure 4:
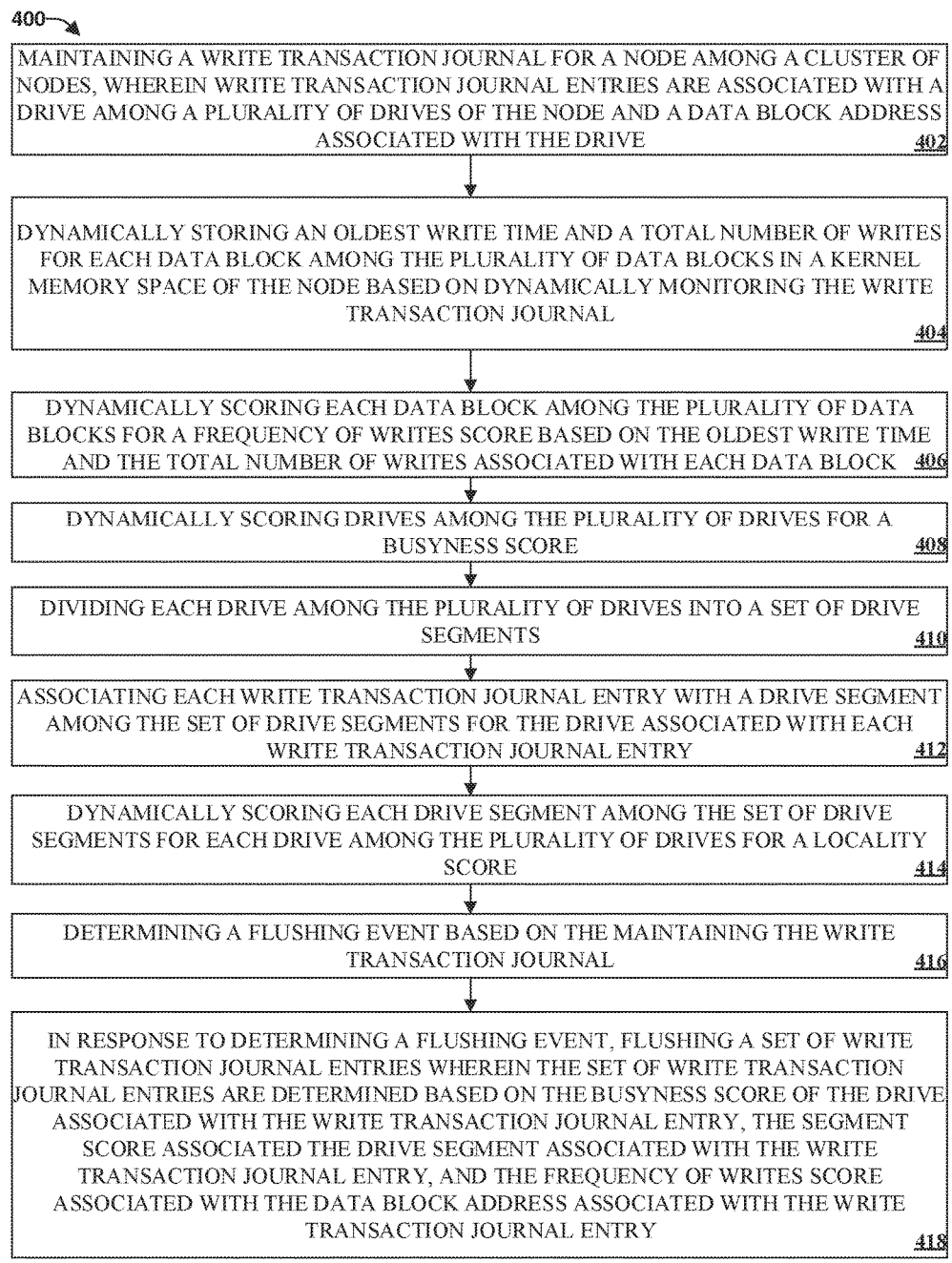
FIG. 4 illustrates an example method for flushing a write transaction journal in accordance with implementations of this disclosure.
Figure 5:
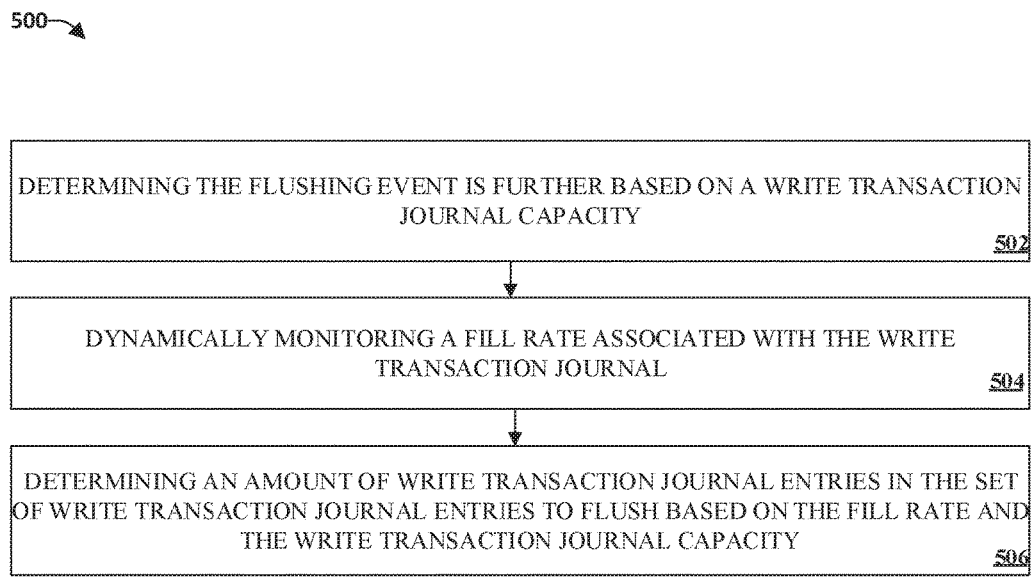
FIG. 5 illustrates an example method for determining when to flush a write transaction journal in accordance with implementations of this disclosure.

FIGS. 4-5 illustrate methods and/or flow diagrams in accordance with this disclosure. For simplicity of explanation, the method is depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Moreover, various acts have been described in detail above in connection with respective system diagrams. It is to be appreciated that the detailed description of such acts in the prior figures can be and are intended to be implementable in accordance with one or more of the following methods.

FIG. 4 illustrates an example method for flushing a write transaction journal in accordance with implementations of this disclosure.

At 402, a write transaction journal can be maintained for a node among a cluster of nodes, wherein write transaction journal entries are associated with a drive among a plurality of drives of the node and a data block address associated with the drive.

At 404, an oldest write time and a total number of writes can be dynamically stored for each data block among the plurality of data blocks in a kernel memory space of the node based on dynamic monitoring the write transaction journal. For example, the method provides for registering writes to data block that are subsequently overwritten within the write transaction journal without ever being flushed to disk. It can be appreciated that understanding how often data is a written to a particular data block is useful in predicting when a future write may occur for the same data block. In one implementation, in response to the kernel memory space allocated for storing the oldest write time and total number of writes for data blocks reaching capacity, the most recent write data to be aggregated from the write transaction journal can dynamically replace in memory the oldest write data for any data block. It can be appreciated that as write transaction journal entry data ages, the data may be less relevant than more recent write transaction journal entry data in predicting future write transactions.

At 406, each data block among the plurality of data blocks can be dynamically scored for a frequency of writes based on the oldest write time and the total number of writes associated with each data block.

At 408, drives among the plurality of drives can be dynamically scored for a busyness score. It can be appreciated that all drive activity can be considered including reads, writes, maintenance activity, etc. when assessing the busyness score of a drive.

At 410, each drive among the plurality of drives can be divided into drive segments. In one implementation, drives can be divided into equal segments based on a preset and/or user configurable segment number.

At 412, each write transaction journal entry can be associated with a drive segment among the set of drive segments for the drive associated with each write transaction journal entry.

At 414, each drive segment among the set of drive segments for each drive among the plurality of drives can be dynamically scored for a locality score. In one implementation, the locality score indicates the number of pending writes within the write transaction journal for each an individual segment.

At 416, a flushing event can be determined based maintaining the write transaction journal. FIG. 5 describes further methods for determining a flushing event.

At 418, in response to determining a flushing event, a set of write transaction journal entries can be flushed, wherein the set of write transaction journal entries are determined based on the busyness score of the drive associated with the write transaction journal entry, the segment score associated with the drive segment associated with the write transaction journal entry, and the frequency of writes score associated with the data block address associated with the write transaction journal entry.

FIG. 5 illustrates an example method for determining when to flush a write transaction journal in accordance with implementations of this disclosure.

At 502, determining the flushing event can be further based on a write transaction journal capacity.

At 504, a fill rate associated with the write transaction journal can be dynamically monitored.

At 506, an amount of write transaction journal entries in the set of write transaction journal entries to flush can be determined based on the fill rate and the write transaction journal capacity.

Figure 6:
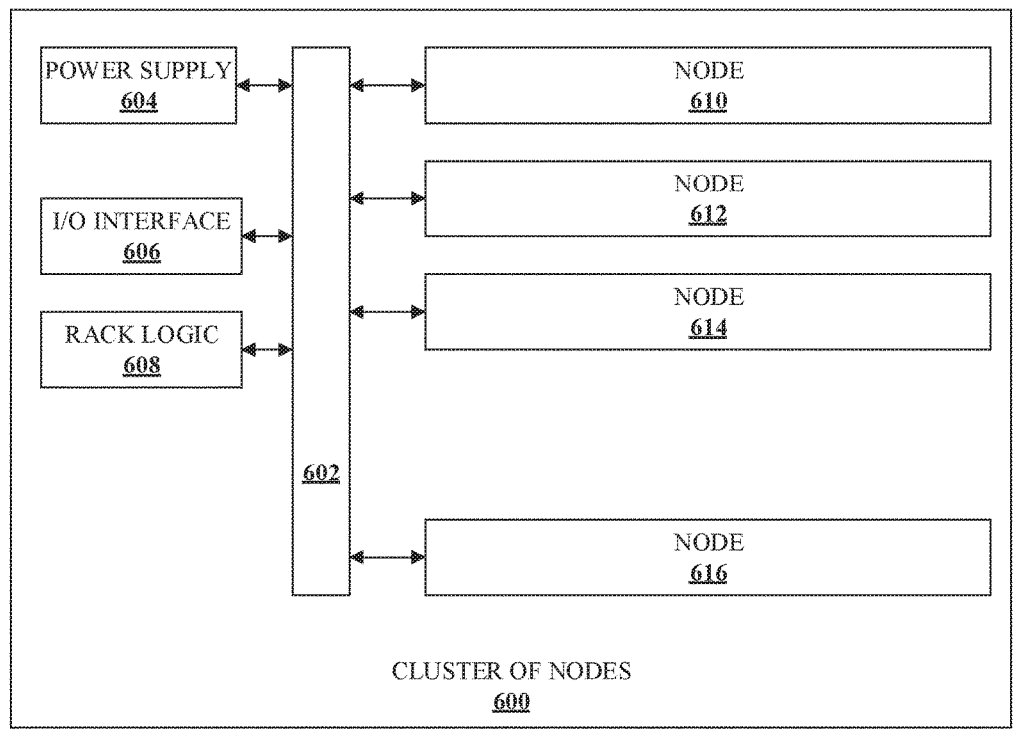
FIG. 6 illustrates an example block diagram of rack of a cluster of nodes in accordance with implementations of this disclosure.

FIG. 6 illustrates an example block diagram of a cluster of nodes in accordance with implementations of this disclosure. However, the components shown are sufficient to disclose an illustrative implementation. Generally, a node is a computing device with a modular design optimized to minimize the use of physical space and energy. A node can include processors, power blocks, cooling apparatus, network interfaces, input/output interfaces, etc. Although not shown, cluster of nodes typically includes several computers that merely require a network connection and a power cord connection to operate. Each node computer often includes redundant components for power and interfaces. The cluster of nodes 500 as depicted shows Nodes 610, 612, 614 and 616 operating in a cluster; however, it can be appreciated that more or less nodes can make up a cluster. It can be further appreciated that nodes among the cluster of nodes do not have to be in a same enclosure as shown for ease of explanation in FIG. 6, and can be geographically disparate. Backplane 602 can be any type of commercially available networking infrastructure that allows nodes among the cluster of nodes to communicate amongst each other in as close to real time as the networking infrastructure allows. It can be appreciated that the backplane 602 can also have a separate power supply, logic, I/O, etc. as necessary to support communication amongst nodes of the cluster of nodes.

As shown in the figure, enclosure 600 contains at least a power supply 604, an input/output interface 606, rack logic 608, several blade servers 610, 612, 614, and 616, and backplane 602. Power supply 604 provides power to each component and blade server within the enclosure. The input/output interface 606 provides internal and external communication for components and blade servers within the enclosure. Backplane 608 can enable passive and active communication of power, logic, input signals, and output signals for each blade server.

It can be appreciated that the Cluster of nodes 600 can be in communication with a second Cluster of Nodes as described in the subject disclosure and work in conjunction to provide at least the implementations as disclosed herein. Nodes can refer to a physical enclosure with a varying amount of CPU cores, random access memory, flash drive storage, magnetic drive storage, etc. For example, a single Node could contain, in one example, 46 disk drive bays with attached disk storage in each bay. It can be appreciated that nodes within the cluster of nodes can have varying configurations and need not be uniform.

Figure 7:
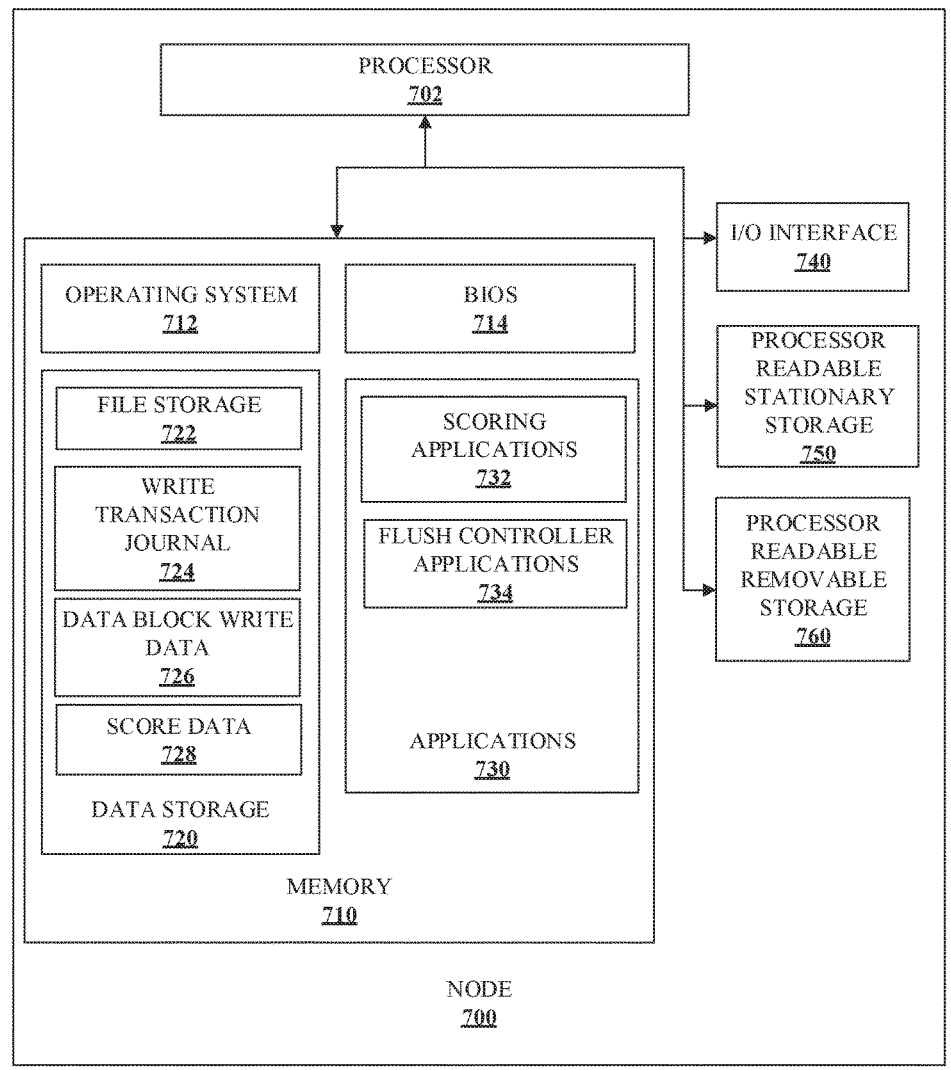
FIG. 7 illustrates an example block diagram of a node in accordance with implementations of this disclosure.

FIG. 7 illustrates an example block diagram of a blade server 700 in accordance with implementations of this disclosure. As shown in FIG. 7, a plurality of blade servers may be included in one enclosure that shares resources provided by the enclosure to reduce size, power, and cost.

Node 700 includes processor 702 which communicates with memory 710 via a bus. Node 700 also includes input/output interface 740, processor-readable stationary storage device(s) 750, and processor-readable removable storage device(s) 760. Input/output interface 740 can enable node 700 to communicate with other nodes, mobile devices, network devices, and the like. Processor-readable stationary storage device 750 may include one or more devices such as an electromagnetic storage device (hard disk), solid state hard disk (SSD), hybrid of both an SSD and a hard disk, and the like. In some configurations, a node may include many storage devices. Also, processor-readable removable storage device 760 enables processor 702 to read non-transitive storage media for storing and accessing processor-readable instructions, modules, data structures, and other forms of data. The non-transitive storage media may include Flash drives, tape media, floppy media, disk media, and the like.

Memory 710 may include Random Access Memory (RAM), Read-Only Memory (ROM), NVRAM, hybrid of RAM and ROM, and the like. As shown, memory 710 includes operating system 712 and basic input/output system (BIOS) 714 for enabling the operation of node 700. In various embodiments, a general-purpose operating system may be employed such as a version of UNIX, LINUX, FreeBSD, OneFS, a specialized server operating system such as Microsoft's Windows Server and Apple Computer's OS X, or the like.

Applications 730 may include processor executable instructions which, when executed by node 700, transmit, receive, and/or otherwise process messages, audio, video, and enable communication with other networked computing devices. Examples of application programs include database servers, file servers, calendars, transcoders, and so forth. Applications 730 may include, for example, scoring applications 732 that support generating score data 728 and flush controller applications 734 that determine when to flush portions of the write transaction journal 724 in according to implementations of this disclosure. It can be appreciated that a UI for such applications can exist, such as within a web UI for the distributed file system as a whole.

Human interface components (not pictured), may be remotely associated with blade server 700, which can enable remote input to and/or output from blade server 700. For example, information to a display or from a keyboard can be routed through the input/output interface 740 to appropriate peripheral human interface components that are remotely located. Examples of peripheral human interface components include, but are not limited to, an audio interface, a display, keypad, pointing device, touch interface, and the like.

Data storage 720 may reside within memory 710 as well, storing file storage 722 data such as metadata or LIN data. It can be appreciated that LIN data and/or metadata can relate to file storage within processor readable stationary storage 750 and/or processor readable removable storage 760. For example, LIN data may be cached in cache memory for faster or more efficient frequent access versus being stored within processor readable stationary storage 750. In addition, Data storage 720 can also store the write transaction journal 724 which in one implementation can be stored within a Non-Volatile Random Access Memory ("NVRAM"); data block write data 726 for use by scoring application 732; and score data 728 generated by scoring application 732 in accordance with implementations of this disclosure.

The illustrated aspects of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders that are not all of which may be explicitly illustrated herein.

What has been described above includes examples of the implementations of the present disclosure. It is, of course, not possible to describe every conceivable combination of components or methods for purposes of describing the claimed subject matter, but many further combinations and permutations of the subject innovation are possible. Accordingly, the claimed subject matter is intended to embrace all such alterations, modifications, and variations that fall within the spirit and scope of the appended claims. Moreover, the above description of illustrated implementations of this disclosure, including what is described in the Abstract, is not intended to be exhaustive or to limit the disclosed implementations to the precise forms disclosed. While specific implementations and examples are described herein for illustrative purposes, various modifications are possible that are considered within the scope of such implementations and examples, as those skilled in the relevant art can recognize.

In particular and in regard to the various functions performed by the above described components, devices, circuits, systems and the like, the terms used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable storage medium having computer-executable instructions for performing the acts and/or events of the various methods of the claimed subject matter.

What is claimed is:

1. A method comprising:
    maintaining a write transaction journal for a node among a cluster of nodes, wherein write transaction journal entries are associated with a drive among a plurality of drives of the node and a data block address associated with the drive;
    dynamically storing an oldest write time and a total number of writes for each data block among the plurality of data blocks in a kernel memory space of the node based on dynamically monitoring the write transaction journal;
    dynamically scoring each data block among the plurality of data blocks for a frequency of writes score based on the oldest write time and the total number of writes associated with each data block;
    dynamically scoring drives among the plurality of drives for a busyness score;
    dividing each drive among the plurality of drives into a set of drive segments;
    associating each write transaction journal entry with a drive segment among the set of drive segments for the drive associated with each write transaction journal entry;
    dynamically scoring each drive segment among the set of drive segments for each drive among the plurality of drives for a locality score;
    determining a flushing event based on the maintaining the write transaction journal; and
    in response to determining a flushing event, flushing a set of write transaction journal entries, wherein the set of write transaction journal entries are determined based on the busyness score of the drive associated with the write transaction journal entry, the segment score associated the drive segment associated with the write transaction journal entry, and the frequency of writes score associated with the data block address associated with the write transaction journal entry.

2. The method of claim 1 wherein determining the flushing event is further based on a write transaction journal capacity.

3. The method of claim 2, further comprising:
    dynamically monitoring a fill rate associated with the write transaction journal;
    determining an amount of write transaction journal entries in the set of write transaction journal entries to flush based on the fill rate and the write transaction journal capacity.

4. The method of claim 1, wherein determining the flushing event is further based on the busyness score of drives among the plurality of drives.

5. The method of claim 1, wherein the set of write transaction journal entries are determined further based on comparing the frequency of writes score associated with the data block with a projected capacity time for write transaction journal.

6. The method of claim 1, wherein the set of write transaction journal entries are determined further based on a least busy busyness score.

7. The method of claim 1, wherein the set of write transaction journal entries are determined further based on a most concentrated locality score.

8. The method of claim 1, wherein the drive and the data block address for write transaction journal entries in the write transaction journal are fixed.

9. The method of claim 1, wherein maintaining the write transaction journal includes overwriting write transaction journal entries targeted to a same block address on a same drive.

10. A system comprising at least one storage device and at least one hardware processor configured to:
    maintain a write transaction journal for a node among a cluster of nodes, wherein write transaction journal entries are associated with a drive among a plurality of drives of the node and a data block address associated with the drive;
    dynamically store an oldest write time and a total number of writes for each data block among the plurality of data blocks in a kernel memory space of the node based on dynamically monitoring the write transaction journal;
    dynamically score each data block among the plurality of data blocks for a frequency of writes score based on the oldest write time and the total number of writes associated with each data block;
    dynamically score drives among the plurality of drives for a busyness score;
    divide each drive among the plurality of drives into a set of drive segments;
    associating each write transaction journal entry with a drive segment among the set of drive segments for the drive associated with each write transaction journal entry;

dynamically score each drive segment among the set of drive segments for each drive among the plurality of drives for a locality score;

determine a flushing event based on the maintaining the write transaction journal; and in response to determining a flushing event, flush a set of write transaction journal entries, wherein the set of write transaction journal entries are determined based on the busyness score of the drive associated with the write transaction journal entry, the segment score associated the drive segment associated with the write transaction journal entry, and the frequency of writes score associated with the data block address associated with the write transaction journal entry.

11. The system of claim 10 wherein determining the flushing event is further based on a write transaction journal capacity.

12. The system of claim 11 further configured to:

dynamically monitoring a fill rate associated with the write transaction journal;

determining an amount of write transaction journal entries in the set of write transaction journal entries to flush based on the fill rate and the write transaction journal capacity.

13. The system of claim 10, wherein determining the flushing event is further based on the busyness score of drives among the plurality of drives.

14. The system of claim 10, wherein the set of write transaction journal entries are determined further based on comparing the frequency of writes score associated with the data block with a projected capacity time for write transaction journal.

15. The system of claim 10, wherein the set of write transaction journal entries are determined further based on a least busy busyness score.

16. The system of claim 10, wherein the set of write transaction journal entries are determined further based on a most concentrated locality score.

17. The system of claim 10, wherein the drive and the data block address for write transaction journal entries in the write transaction journal are fixed.

18. The system of claim 10, wherein maintaining the write transaction journal includes overwriting write transaction journal entries targeted to a same block address on a same drive.

19. A non-transitory computer readable medium with program instructions stored thereon to perform the following acts:

maintaining a write transaction journal for a node among a cluster of nodes, wherein write transaction journal entries are associated with a drive among a plurality of drives of the node and a data block address associated with the drive;

dynamically storing an oldest write time and a total number of writes for each data block among the plurality of data blocks in a kernel memory space of the node based on dynamically monitoring the write transaction journal;

dynamically scoring each data block among the plurality of data blocks for a frequency of writes score based on the oldest write time and the total number of writes associated with each data block;

dynamically scoring drives among the plurality of drives for a busyness score;

dividing each drive among the plurality of drives into a set of drive segments;

associating each write transaction journal entry with a drive segment among the set of drive segments for the drive associated with each write transaction journal entry;

dynamically scoring each drive segment among the set of drive segments for each drive among the plurality of drives for a locality score;

determining a flushing event based on the maintaining the write transaction journal; and in response to determining a flushing event, flushing a set of write transaction journal entries, wherein the set of write transaction journal entries are determined based on the busyness score of the drive associated with the write transaction journal entry, the segment score associated the drive segment associated with the write transaction journal entry, and the frequency of writes score associated with the data block address associated with the write transaction journal entry.

20. The non-transitory computer readable medium of claim 19, wherein the set of write transaction journal entries are determined further based on comparing the frequency of writes score associated with the data block with a projected capacity time for write transaction journal.

* * * * *